United States Patent
Azuma et al.

(10) Patent No.: US 12,078,470 B2
(45) Date of Patent: Sep. 3, 2024

(54) HEIGHT MEASUREMENT DEVICE

(71) Applicant: FUJI CORPORATION, Chiryu (JP)

(72) Inventors: Takumi Azuma, Chiryu (JP); Nobuo Oishi, Kosai (JP)

(73) Assignee: FUJI CORPORATION, Chiryu (JP)

( * ) Notice: Subject to any disclaimer, the term of this patent is extended or adjusted under 35 U.S.C. 154(b) by 356 days.

(21) Appl. No.: 17/642,433

(22) PCT Filed: Sep. 26, 2019

(86) PCT No.: PCT/JP2019/037892
§ 371 (c)(1),
(2) Date: Mar. 11, 2022

(87) PCT Pub. No.: WO2021/059438
PCT Pub. Date: Apr. 1, 2021

(65) Prior Publication Data
US 2022/0341726 A1 Oct. 27, 2022

(51) Int. Cl.
*G01B 11/06* (2006.01)
*G01B 11/24* (2006.01)

(52) U.S. Cl.
CPC .......... *G01B 11/0608* (2013.01); *G01B 11/24* (2013.01)

(58) Field of Classification Search
CPC ............... G01B 11/0608; G01B 11/24; G05B 2219/40613; B25J 9/1697
See application file for complete search history.

(56) References Cited

U.S. PATENT DOCUMENTS

| 5,229,619 A * | 7/1993 | Van Amstel | G01B 11/026 250/559.22 |
| 5,621,814 A * | 4/1997 | Honda | G01B 11/0608 382/152 |
| 5,841,832 A * | 11/1998 | Mazess | A61B 6/482 250/367 |

(Continued)

FOREIGN PATENT DOCUMENTS

JP  5-245791 A  9/1993

OTHER PUBLICATIONS

International Search Report mailed on Dec. 3, 2019 in PCT/JP2019/037892 filed on Sep. 26, 2019.

*Primary Examiner* — Roy M Punnoose
(74) *Attorney, Agent, or Firm* — Oblon, McClelland, Maier & Neustadt, L.L.P.

(57) ABSTRACT

A height measurement device images a target, extracts a contour of the target from a two-dimensional image, sets a circumscribed rectangular area of which each side is parallel to a corresponding side of the visual field of the camera and each side is circumscribed with the extracted contour of the target, and sets an extension area in which each of four sides of the set circumscribed rectangular area is extended outward by a predetermined amount. The height measurement device determines multiple imaging positions such that maximum parallax is obtained within a range where the extension area does not protrude from the visual field of the camera. Then, the height measurement device images the target at each of the determined multiple imaging positions, and estimates a height of the target from parallax of a two-dimensional image of the target imaged at each of the multiple imaging positions.

3 Claims, 5 Drawing Sheets

(56) References Cited

U.S. PATENT DOCUMENTS

| | | | |
|---|---|---|---|
| 10,473,454 B1* | 11/2019 | Ding | G01B 11/0608 |
| 2004/0239948 A1* | 12/2004 | Harding | G01B 11/24 |
| | | | 356/601 |
| 2012/0120414 A1* | 5/2012 | Jeong | H05K 13/08 |
| | | | 356/610 |

* cited by examiner

HEIGHT MEASUREMENT DEVICE

TECHNICAL FIELD

The present specification discloses a height measurement device.

BACKGROUND ART

Conventionally, as a height measurement device, a device has been proposed in which a work target is imaged by a camera attached to a robot arm while changing the position and posture of the robot arm to multiple locations, and the three-dimensional position of the work target is calculated by triangulation based on an image for each position and posture and the position and posture of the camera at that time (see Patent Literature 1, for example).

PATENT LITERATURE

Patent Literature 1: JP-A-H5-245791

BRIEF SUMMARY

Technical Problem

In the height measurement device described above, sufficient parallax may not be obtained depending on the size of the visual field of the camera or the size of a target, so that the height of the target may not be measured with good precision.

A main object of the present disclosure is to measure the height of a target with good precision.

Solution to Problem

The present disclosure adopts the following means to achieve the main object described above.

According to the present disclosure, there is provided a height measurement device that measures a height of a target, the device including a camera having a rectangular visual field, a moving device configured to relatively move the camera and the target, and a control device configured to control the moving device and the camera such that the target loaded at a predetermined position of a loading surface is imaged, extract a contour of the target from a two-dimensional image of the imaged target, set a circumscribed rectangular area of which each side is parallel to a corresponding side of the visual field of the camera and each side is circumscribed with the extracted contour of the target, set an extension area in which each of four sides of the set circumscribed rectangular area is extended outward by a predetermined amount, determine multiple imaging positions such that maximum parallax is obtained within a range where the set extension area does not protrude from the visual field of the camera, control the moving device and the camera such that the target is imaged at each of the determined multiple imaging positions, and estimate the height of the target from parallax of a two-dimensional image of the target imaged at each of the multiple imaging positions.

The height measurement device of the present disclosure images a target loaded at a predetermined position of a loading surface, and extracts a contour of the target from a two-dimensional image of the imaged target. Subsequently, the height measurement device sets a circumscribed rectangular area of which each side is parallel to a corresponding side of the visual field of the camera and each side is circumscribed with the extracted contour of the target, and sets an extension area in which each of four sides of the set circumscribed rectangular area is extended outward by a predetermined amount. Next, the height measurement device determines multiple imaging positions such that maximum parallax is obtained within a range where the set extension area does not protrude from the visual field of the camera. Then, the height measurement device images the target at each of the determined multiple imaging positions, and estimates a height of the target from parallax of a two-dimensional image of the target imaged at each of the multiple imaging positions. Thereby, even in a case where the size of the target is relatively large, it is possible to determine multiple imaging positions to secure sufficient parallax. As a result, the height of the target can be measured with good precision.

DESCRIPTION OF EMBODIMENTS

Next, an embodiment of the present disclosure will be described with reference to the drawings.

Figure 1:
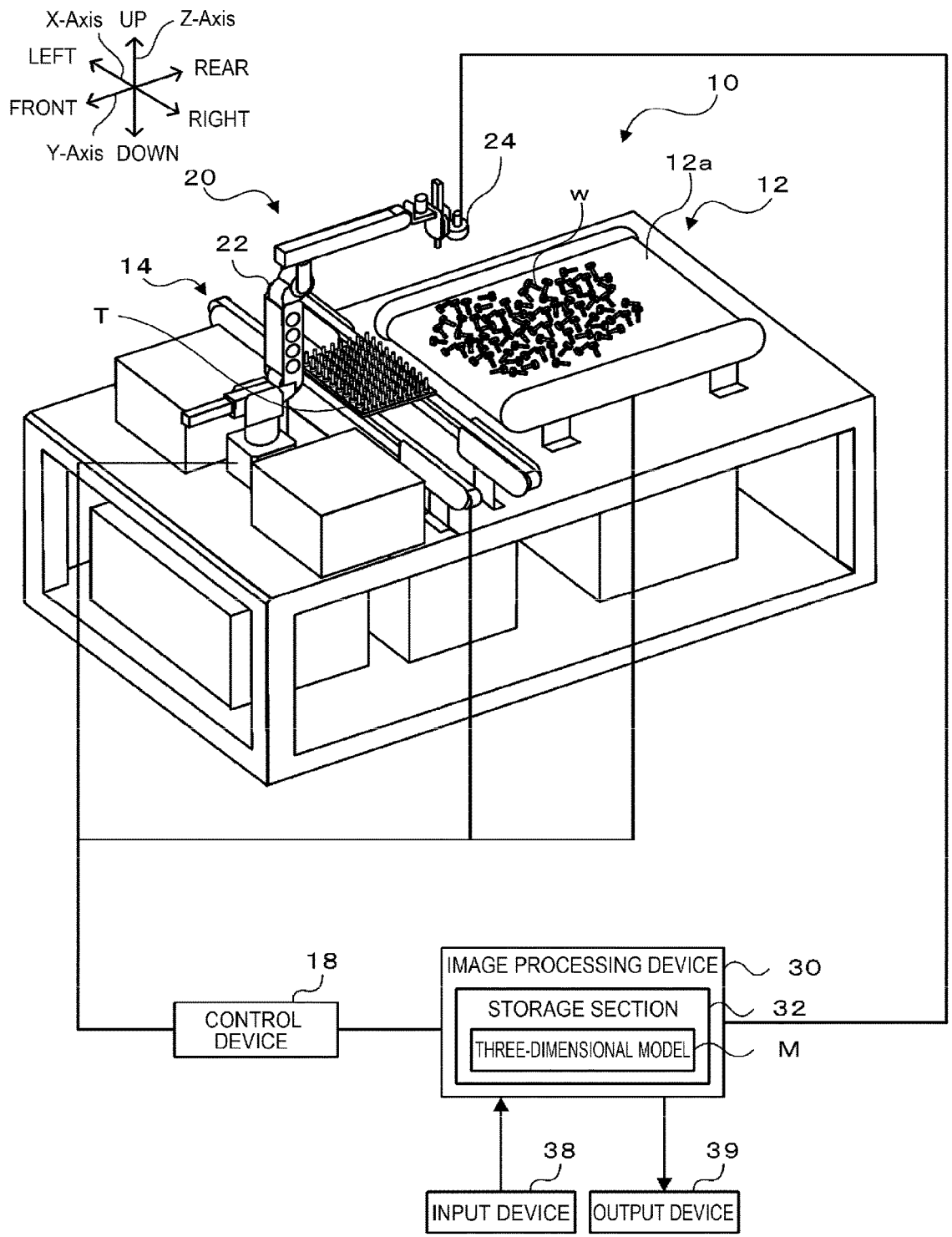
FIG. 1 is a configuration diagram schematically showing a configuration of robot system 10 including a height measurement device of the present embodiment.

FIG. 1 is a configuration diagram schematically showing a configuration of robot system 10 including a height measurement device of the present embodiment. In FIG. 1, a left-right direction is an X-axis direction, a front-rear direction is a Y-axis direction, and an up-down direction is a Z-axis direction. As shown in the figure, robot system 10 includes supply device 12, conveyance device 14, work robot 20, and control device 18. Supply device 12 includes conveyor belt 12a spanning over a driving roller and a driven roller disposed at an interval in the front-rear direction (the Y-axis direction), and supplies multiple workpieces w such as mechanical components and electronic components on conveyor belt 12a from the rear side to the front side by rotational driving of the driving roller. Conveyance device 14 includes a conveyor belt, conveys tray T in a direction (the X-axis direction) orthogonal to the supplying direction of workpiece w, and positions and holds tray T at a center position. Control device 18 includes CPU, ROM, RAM, HDD, an input/output port, and the like, and controls each operation of supply device 12, conveyance device 14, and work robot 20.

Work robot 20 includes vertical articulated robot arm 22 having a chuck as a work tool at the distal end, camera 24 attached to the distal end of robot arm 22, and image processing device 30 for processing an image captured by camera 24. Work robot 20 picks up workpiece w on conveyor belt 12a with the chuck by operation of robot arm 22, and performs work of placing workpiece w on tray T, work of assembling workpiece w at a predetermined position, and the like. Camera 24 captures a two-dimensional image in order to recognize the position, orientation, and height of workpiece w and outputs the image to image processing device 30. Image processing device 30 includes storage section 32 for storing a program necessary for image processing, three-dimensional model M, and the like, and is connected to input device 38, such as a keyboard or a mouse, and output device 39, such as a display. Hereinafter, processing for recognizing the height of workpiece w will be described. Processing for recognizing the position and orientation of workpiece w is not described in the gist of the present disclosure, and therefore, description thereof will be omitted. Here, camera 24, control device 18, and image processing device 30 correspond to the height measurement device of the present disclosure.

Figure 2:
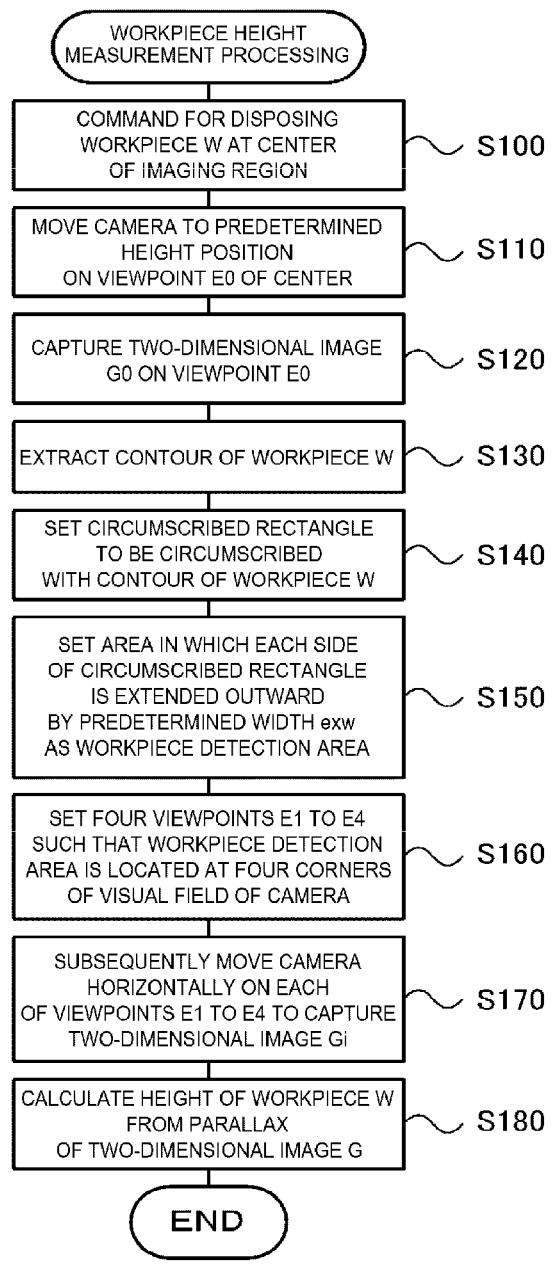
FIG. 2 is a flowchart showing an example of workpiece height measurement processing.

FIG. 2 is a flowchart showing an example of workpiece height measurement processing. This processing is mainly executed by the function of image processing device 30. In the workpiece height measurement processing, image processing device 30 first outputs an instruction to output device 39 so as to dispose workpiece w at the center of an imaging region (S100). An operator disposes workpiece w in accordance with the instruction output to output device 39. Subsequently, image processing device 30 transmits an instruction signal to control device 18 to cause work robot 20 to move camera 24 onto viewpoint E0, which is the center of visual field S (S110), and to cause camera 24 to capture two-dimensional image G0 at a predetermined height position on viewpoint E0 (S120). Thus, two-dimensional image G0 is an image obtained by imaging workpiece w from directly above.

Figure 3:
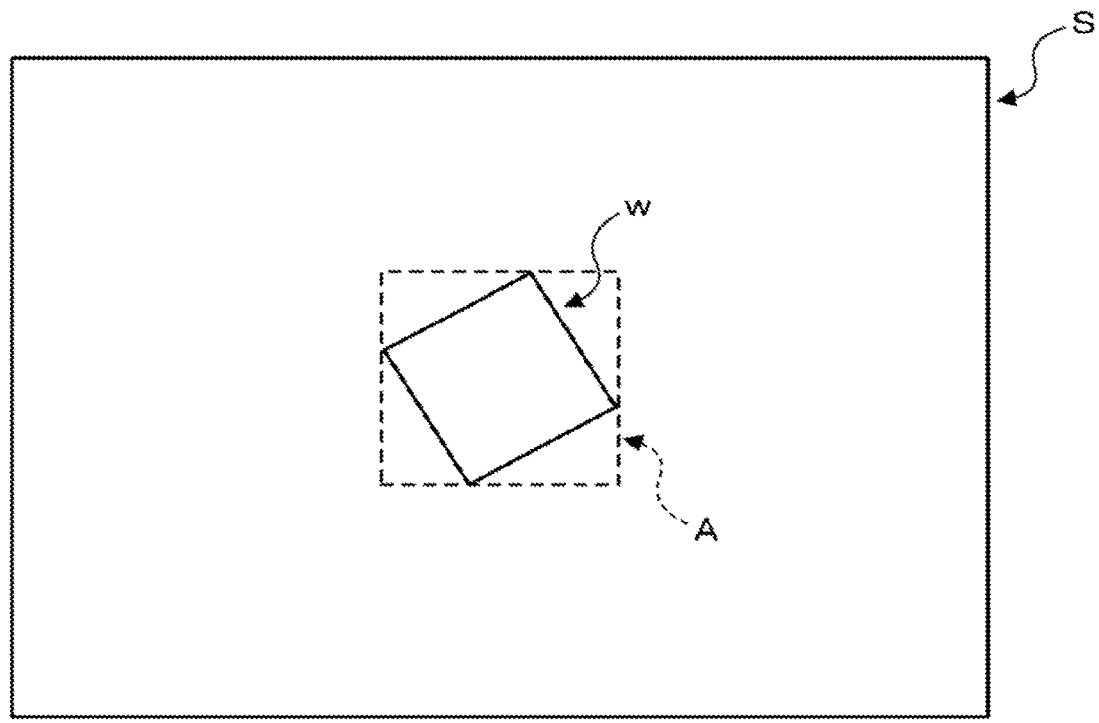
FIG. 3 is an explanatory diagram showing an example of circumscribed rectangular area A.
Figure 4:
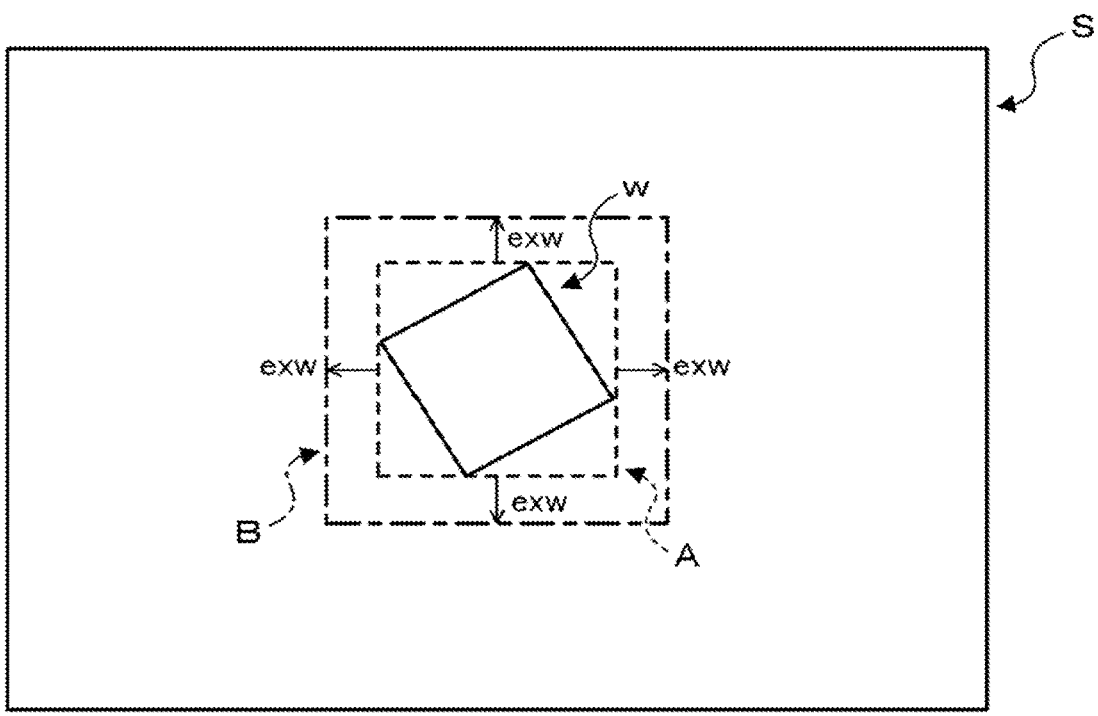
FIG. 4 is an explanatory diagram showing an example of workpiece detection area B.
Figure 5:
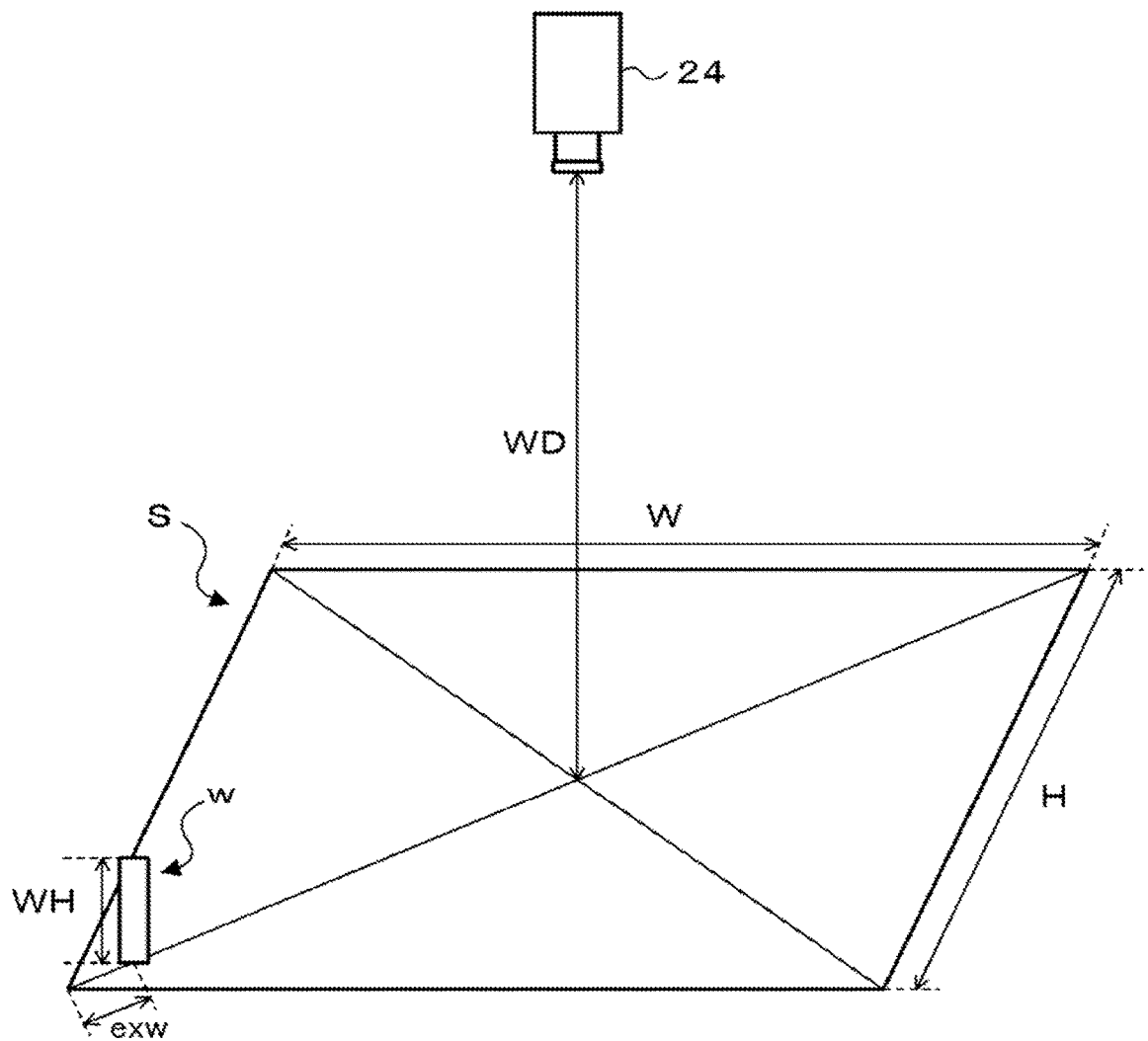
FIG. 5 is an explanatory diagram for explaining extension width exw.
Figure 6:
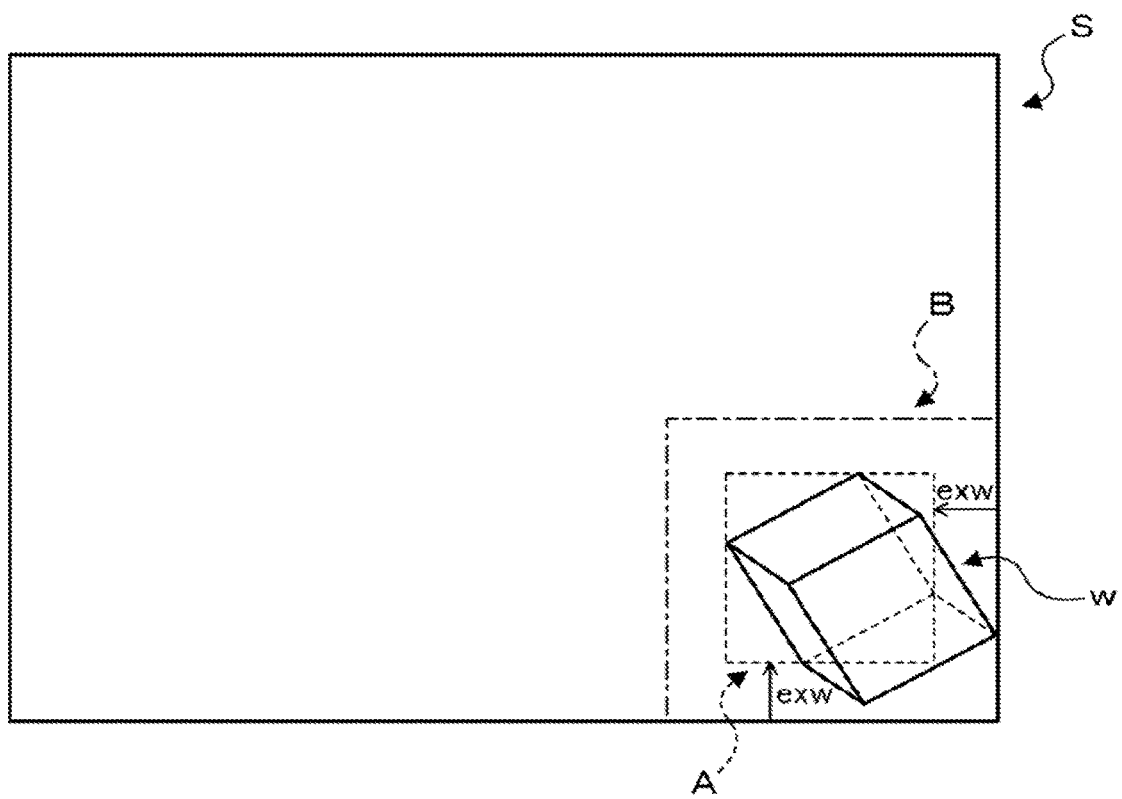
FIG. 6 is an explanatory diagram showing a state of setting of a viewpoint when imaging workpiece W.

When two-dimensional image G0 is captured, image processing device 30 extracts the contour of workpiece w from two-dimensional image G0 (S130). Subsequently, image processing device 30 sets circumscribed rectangular area A that is circumscribed with the extracted contour of workpiece w (S140). FIG. 3 is an explanatory diagram showing an example of circumscribed rectangular area A. As shown in the figure, circumscribed rectangular area A is set as a rectangular area of which each side is parallel to a corresponding side of rectangular visual field S of camera 24 and circumscribed with the contour of workpiece w. As shown in FIG. 4, image processing device 30 sets, as workpiece detection area B, a rectangular extension area in which each side of circumscribed rectangular area A is extended outward by a predetermined width (extension width exw) (S150). Extension width exw is calculated by the following equation (1). In Equation (1), "WH" represents the maximum height of the workpiece that can be measured by the height measurement device of the present disclosure. "W" and "H" respectively represent the horizontal width and the vertical width of visual field S of camera 24. "WD" represents the distance between camera 24 and a loading surface of workpiece w. As shown in FIG. 5, in a case where workpiece w is imaged at a position away from the center of visual field S of camera 24, extension width exw represents the length of the image of workpiece W in a direction connecting the center of the captured image and the position of workpiece W. As shown in FIG. 6, when the height of workpiece w which is an imaging target is within a range of maximum height WH, workpiece w is imaged by making workpiece w to be located inside the outer edge of visual field S of camera 24 by extension width exw, whereby workpiece w can be prevented from protruding from visual field S of camera 24.

[Math. 1]

$$exw = \frac{WH}{WD} \times \frac{\sqrt{W^2 + H^2}}{2} \quad (1)$$

Image processing device 30 sets four viewpoints E1 to E4 such that workpiece detection area B is located at four corners of visual field S of camera 24 (S160). Subsequently, image processing device 30 subsequently moves camera 24 horizontally on each of viewpoints E1 to E4 to capture two-dimensional image Gi (i=1, 2, 3, 4) by camera 24 (S170). Then, image processing device 30 calculates the height of workpiece w from each two-dimensional image Gi (S180), and terminates the present processing. This processing is performed by recognizing workpiece w from each two-dimensional image Gi and calculating the height of workpiece w by triangulation based on the parallax of recognized workpiece w. When the height of workpiece w which is an imaging target is within a range of maximum height WH, workpiece W does not protrude from visual field S of camera 24 by imaging workpiece W at each of four viewpoints E1 to E4, so that the parallax between workpieces w recognized in multiple two-dimensional images Gi can be maximized. Thereby, the height of workpiece w can be measured with favorable precision.

Here, correspondence relationships between constituent elements of the present embodiment and constituent elements of the present disclosure will be clarified. Workpiece w in the embodiment corresponds to a target, camera 24 corresponds to a camera, and image processing device 30 and control device 18 that execute the workpiece height measurement processing in FIG. 2 correspond to a control device.

The present disclosure is not limited to the embodiment that has been described heretofore at all, and needless to say, the present disclosure may be carried out in various modes without departing from the technical scope thereof.

For example, in the above embodiment, four viewpoints at which workpiece detection area B is located at each of four corners of visual field S are exemplified as multiple viewpoints of camera 24 that captures two-dimensional image Gi in order to measure the height of workpiece W. However, since the height of workpiece w need only be measured by the parallax of workpiece w recognized in each of multiple two-dimensional images Gi, the number of viewpoints need only be two or more.

In the above embodiment, two-dimensional image Gi is captured at multiple viewpoints by moving camera 24 with respect to workpiece W. However, since two-dimensional image Gi need only be captured at multiple viewpoints by relatively moving workpiece w and camera 24, and workpiece w may be moved instead of camera 24.

In the present embodiment described above, a vertical articulated robot is exemplified as work robot 20; however, the configuration is not limited to this, and a horizontal articulated robot, a parallel link robot, an orthogonal robot, or the like may be exemplified. The present disclosure may be applied to any device that performs work using the height of the workpiece. In addition, the height of a target may be measured using a dedicated height measurement device including a camera.

As described above, according to the present disclosure, there is provided a height measurement device that measures a height of a target, the device including a camera having a rectangular visual field, a moving device configured to relatively move the camera and the target, and a control device configured to control the moving device and the camera such that the target loaded at a predetermined position of a loading surface is imaged, extract a contour of the target from a two-dimensional image of the imaged target, set a circumscribed rectangular area of which each side is parallel to a corresponding side of the visual field of the camera and each side is circumscribed with the extracted contour of the target, set an extension area in which each of four sides of the set circumscribed rectangular area is extended outward by a predetermined amount, determine multiple imaging positions such that maximum parallax is obtained within a range where the set extension area does not protrude from the visual field of the camera, control the moving device and the camera such that the target is imaged at each of the determined multiple imaging positions, and estimate the height of the target from parallax of a two-dimensional image of the target imaged at each of the multiple imaging positions.

The height measurement device of the present disclosure images a target loaded at a predetermined position of a loading surface, and extracts a contour of the target from a two-dimensional image of the imaged target. Subsequently, the height measurement device sets a circumscribed rectangular area of which each side is parallel to a corresponding side of the visual field of the camera and each side is circumscribed with the extracted contour of the target, and sets an extension area in which each of four sides of the set circumscribed rectangular area is extended outward by a predetermined amount. Next, the height measurement device determines multiple imaging positions such that maximum parallax is obtained within a range where the set extension area does not protrude from the visual field of the camera. Then, the height measurement device images the target at each of the determined multiple imaging positions, and estimates a height of the target from parallax of a two-dimensional image of the target imaged at each of the multiple imaging positions. Thereby, even in a case where the size of the target is relatively large, it is possible to determine multiple imaging positions to secure sufficient parallax. As a result, the height of the target can be measured with good precision.

In the height measurement device of the present disclosure, assuming that the predetermined amount is exw, a measurable maximum height of the target is WH, a length of a horizontal width of the visual field is W, a length of a vertical width of the visual field is H, and a distance between the camera and the loading surface is WD, the predetermined amount may be calculated by the following equation (1). In this way, the height of the target can be measured with good precision within a range of the maximum height of the target.

[Math. 2]

$$exw = \frac{WH}{WD} \times \frac{\sqrt{W^2 + H^2}}{2} \quad (1)$$

In the height measurement device of the present disclosure, the multiple imaging positions may include at least an imaging position for imaging the target at four corners of the visual field of the camera.

INDUSTRIAL APPLICABILITY

The present disclosure can be applied to a manufacturing industry of a height measurement device or the like.

REFERENCE SIGNS LIST

10 robot system, 12 supply device, 12a conveyor belt, 14 conveyance device, 18 control device, 20 work robot, 22 robot arm, 24 camera, 30 image processing device, 32 storage section, 38 input device, 39 output device, M three-dimensional model, T tray, W workpiece

The invention claimed is:

1. A height measurement device that measures a height of a target, the device comprising:
   a camera having a rectangular visual field;
   a moving device configured to relatively move the camera and the target; and
   a control device configured to
   control the moving device and the camera such that the target loaded at a predetermined position of a loading surface is imaged,
   extract a contour of the target from a two-dimensional image of the imaged target,
   set a circumscribed rectangular area of which each side is parallel to a corresponding side of the visual field of the camera and each side is circumscribed with the extracted contour of the target,
   set an extension area in which each of four sides of the set circumscribed rectangular area is extended outward by a predetermined amount,
   determine multiple imaging positions such that maximum parallax is obtained within a range where the set extension area does not protrude from the visual field of the camera,
   control the moving device and the camera such that the target is imaged at each of the determined multiple imaging positions, and
   estimate the height of the target from parallax of a two-dimensional image of the target imaged at each of the multiple imaging positions.

2. The height measurement device according to claim 1, wherein assuming that the predetermined amount is exw, a measurable maximum height of the target is WH, a length of a horizontal width of the visual field is W, a length of a vertical width of the visual field is H, and a distance between the camera and the loading surface is WD, the predetermined amount is calculated by the following equation (1), $$exw = \frac{WH}{WD} \times \frac{\sqrt{W^2 + H^2}}{2}. \quad (1)$$

3. The height measurement device according to claim 1, wherein the multiple imaging positions include at least an imaging position for imaging the target at four corners of the visual field of the camera.

* * * * *